United States Patent
No et al.

(10) Patent No.: US 8,315,614 B2
(45) Date of Patent: Nov. 20, 2012

(54) METHOD AND APPARATUS OF TRANSMITTING PERSONAL INFORMATION IN SUBSCRIBER-BASED RINGBACK TONE SERVICE

(75) Inventors: Yeong-Tae No, Seoul (KR); Sang-Yun Lee, Gyeonggi-do (KR); Hee-Hyeok Hahm, Seoul (KR); Ki-Mun Kim, Incheon (KR); Jae-Young Park, Seoul (KR); Soon-Ki Hwang, Seoul (KR)

(73) Assignee: SK Telecom., Ltd., Seoul (KR)

( * ) Notice: Subject to any disclaimer, the term of this patent is extended or adjusted under 35 U.S.C. 154(b) by 1094 days.

(21) Appl. No.: 10/589,550

(22) PCT Filed: Oct. 20, 2004

(86) PCT No.: PCT/KR2004/002682
§ 371 (c)(1), (2), (4) Date: Jul. 3, 2007

(87) PCT Pub. No.: WO2005/081509
PCT Pub. Date: Sep. 1, 2005

(65) Prior Publication Data
US 2008/0002824 A1 Jan. 3, 2008

(30) Foreign Application Priority Data
Feb. 20, 2004 (KR) ................ 10-2004-0011571

(51) Int. Cl.
H04M 3/02 (2006.01)
(52) U.S. Cl. ................. 455/418; 455/567
(58) Field of Classification Search ............. 455/400, 455/401, 414.1, 414.2, 458, 567
See application file for complete search history.

(56) References Cited

U.S. PATENT DOCUMENTS
6,768,789 B1 * 7/2004 Wilk ................ 379/67.1
(Continued)

FOREIGN PATENT DOCUMENTS
JP 2003-101612 4/2003
(Continued)

OTHER PUBLICATIONS
International Search Report for PCT Application No. PCT/KR2004/002682 mailed Jan. 28, 2005. Japanese Office Action for application No. 2006-554014, citing the attached reference(s).

*Primary Examiner* — Ajit Patel
*Assistant Examiner* — Myron K Wyche
(74) *Attorney, Agent, or Firm* — Lowe Hauptman Ham & Berner, LLP

(57) ABSTRACT

A method and apparatus for a called subscriber to send a sound for his own personal information as a ringback tone with a ringback tone replacing sound are disclosed. The method comprises the steps of: HLR providing MSC with the first information about whether a ringback tone is to be replaced or not and the second information for routing to sound providing means when a called terminal is registered in MSC; MSC requesting a call connection to the sound providing means based on the first and second information when the called terminal is called; and the sound providing means call-connecting to the calling terminal, and providing the calling terminal with a specific sound, wherein the specific sound is generated by combining a subscriber information sound, which can identify the called subscriber or can represent the subscriber's character, with the ringback tone replacing sound.

24 Claims, 4 Drawing Sheets

U.S. PATENT DOCUMENTS

| | | | |
|---|---|---|---|
| 7,509,149 B2* | 3/2009 | Shim et al. | 455/567 |
| 2002/0193125 A1* | 12/2002 | Smith | 455/458 |
| 2004/0120494 A1* | 6/2004 | Jiang et al. | 379/210.01 |
| 2004/0174983 A1* | 9/2004 | Olschwang et al. | 379/377 |
| 2004/0203613 A1* | 10/2004 | Zhu et al. | 455/412.1 |
| 2005/0096006 A1* | 5/2005 | Chen et al. | 455/400 |
| 2005/0096996 A1* | 5/2005 | Hall et al. | 705/26 |
| 2007/0123311 A1* | 5/2007 | Kim et al. | 455/567 |

FOREIGN PATENT DOCUMENTS

| | | |
|---|---|---|
| JP | 2003-283660 | 10/2003 |
| JP | 2003-338871 | 11/2003 |
| KR | 20-0313671 Y1 | 5/2003 |

* cited by examiner

METHOD AND APPARATUS OF TRANSMITTING PERSONAL INFORMATION IN SUBSCRIBER-BASED RINGBACK TONE SERVICE

This application is a U.S. National Phase Application of PCT International Application No. PCT/KR2004/002682, filed Oct. 20, 2004.

TECHNICAL FIELD

The present invention relates to a method and apparatus for a subscriber-based ringback tone service of providing a specific sound, which a called subscriber has chosen as a ringback tone, in order to improve the existing uniform ringback tone service. More specifically, the present invention relates to a method and apparatus for the called subscriber to send his own personal information as a sound by various ways or to send the personal information along with a pre-set ringback tone replacement sound by various ways.

BACKGROUND ART

In general, when a caller calls another through an existing mobile communication network, a terminating exchanger of the called subscriber provides the caller with a uniform ringback tone. Since the ringback tone is the same all the time, the caller cannot identify the called individual before the called individual answers. Furthermore, the uniform ringback tone cannot satisfy various subscribers' needs to reveal their individuality.

A method was proposed to send various ad sound messages to a caller instead of such uniform ringback tone. However, such an ad sound message is chosen unilaterally by a network operating enterprise. If a caller heard such a unilateral ad sound, he could talk over a mobile telephone with the called individual for a limited time for free. However, the method in which the ad sound is provided instead of the conventional ringback tone still has the aforementioned drawbacks. That is, a caller cannot identify a called individual before the called individual answers and the uniform ringback tone cannot satisfy various subscribers' needs to reveal their individuality.

In Korean Patent Application No. 2000-10006 dated Feb. 25, 2002, the applicant of the present application had disclosed a method and apparatus for providing a subscriber-based ringback tone service. This application provides a caller with a specific sound registered or chosen by a called subscriber instead of a conventional ringback tone, whereby a sound replacing the ringback tone which fits to the called subscriber's character can be provided with the caller while the caller can identify a called individual before the called individual answers, and the caller can determine the existence of a wrong connection before a called individual makes a response.

However, although the conventional art has an advantage in that the individuality of the called subscriber can be revealed by providing the caller with a replacement sound such as music instead of the ringback tone, it has a problem in that a caller cannot determine a wrong connection only by the ringback tone replacement sound of the called subscriber. In addition, the called subscriber cannot send the caller the information which the called subscriber designates to be sent, since a common sound resource is used for the replacement sound so other subscribers can use the identical replacement sound.

DISCLOSURE OF THE INVENTION

The present invention provides a method and apparatus for transmitting personal information in a subscriber-based ringback tone service which can transmit the personal information representing a called subscriber by a ringback tone replacement sound.

According to a first aspect of the present invention, an exemplary method for transmitting personal information in a subscriber-based ringback tone service comprises a home location register providing a call-terminating exchanger with first information on whether or not a registered ringback tone previously set in the home location register is to be replaced and second information for routing to sound providing means when a calling terminal is registered in the call-terminating exchanger; the call-terminating exchanger requesting a call connection to the sound providing means based on the first and the second information if the calling terminal requests a call to a called terminal; and the sound providing means call-connecting to the calling terminal, detecting a specific sound set corresponding to the called terminal, and providing the calling terminal with the detected specific sound if the call connection is received, wherein the specific sound is generated by combining a subscriber information sound for specific information, which can identify the called subscriber or can represent the subscriber's character, with a common ringback tone replacement sound set by the called subscriber.

According to another aspect of the present invention, text information of the personal information sound can be conversed as a voice by using a text-to-speech (TTS) engine in a web server or a WAP server. Also, the personal information sound can be inputted as a voice by an automatic response service (ARS).

According to yet another aspect of the present invention, the personal information sound is modulated by a voice modulation device, and the specific information includes at least one of the called subscriber's phone number, name, nickname and character.

According to yet a further aspect of the present invention, the personal information sound is different by time zone, and the replacement sound is different by time zone. In addition, the replacement sound is at least one or more among a basic replacement sound which is not classified according to callers; a replacement sound which is classified according to callers; and a replacement sound which is set by time zone.

According to a second aspect of the present invention, the method for transmitting personal information in a subscriber-based ringback tone service comprises a call-originating exchanger requesting location information to a home location register when a calling terminal requests a call to a called terminal; the home location register requesting routing information of the called terminal to the call-terminating exchanger and providing the call-terminating exchanger with the routing information, the first information and the second information from the call-terminating exchanger if the request for the location information of the called terminal is received, wherein the first information is concerned about whether or not the ringback tone correspondingly set in the called terminal is to be replaced and the second information is for routing to a sound providing means; the call-originating exchanger requesting a call connection to the sound providing means based on the first and the second information; and the sound providing means call-connecting to the calling terminal, detecting a specific sound which is correspondingly set to the called terminal to provide the calling terminal with the detected specific sound if the request for the call connection is received, wherein the specific sound is generated by combining personal information sound for specific information, which can identify the called subscriber or can represent the character of the called subscriber, with the ringback tone replacement sound which is set by the called subscriber.

According to another aspect of the present invention, text information of the personal information is converted to voice information by the text-to-speech (TTS) engine in a web or a WAP server. In addition, the personal information sound can be inputted as a voice via the ARS.

According to yet another aspect of the present invention, the personal information sound is modulated by a voice modulation device, and the specific information includes at least one of the called subscriber's phone number, name, nick name and character.

According to yet a further aspect of the present invention, the personal information sound is different by time zone, and the replacement sound is different by time zone. In addition, the replacement sound is at least one of a basic replacement sound which is not classified according to callers; a replacement sound which is classified according to callers; and a replacement sound which is set by time zone.

An exemplary apparatus for transmitting personal information in a subscriber-based ringback tone service according to the second aspect of the present invention comprises: a home location register for providing a first information about whether or not the ringback tone set in the profile of the called terminal of the call-terminating exchanger is replaced and a second information for routing to a sound providing means when the called terminal is registered in the call-terminating exchanger; a call-terminating exchanger for requesting a call connection to the sound providing means based on the first and the second information if a request for a call to the called terminal is received; and sound providing means for call connecting with the calling terminal, detecting a specific sound which is set corresponding to the called terminal to provide the calling terminal with the detected specific sound if the request for the call connection is received from the call-terminating exchanger, wherein the specific sound is generated by combining a personal information sound for specific information with the common ringback tone replacement sound which is set by the called subscriber.

According to a further aspect, the apparatus further comprises a web server which is connected to the Internet and communicates with the sound providing device via a gateway, wherein the web server comprises a TTS engine for changing text of specific information which is inputted by a called subscriber and which can identify the called subscriber or can represent the character of the called subscriber, and the sound providing means generates a specific sound by combining the personal information sound transmitted from the web server with the ringback tone replacement sound set by the called subscriber to provide the calling terminal with the specific sound as the replacement sound through the call-terminating exchanger.

According to another aspect of the present invention, the apparatus further comprises an ARS for the called subscriber to input the specific information as a voice.

According to yet another aspect of the present invention, the specific information includes at least one of the called subscriber's phone number, name, nickname and character.

Also, according to yet a further aspect of the present invention, the web server further comprises a voice modifying device for modifying the personal information sound to various voices, wherein the voice modifying device is characterized in that the personal information sound is outputted as a voice to a melody.

PREFERRED EMBODIMENT OF THE INVENTION

Hereinafter, some non-limiting preferred embodiments of a method and apparatus for transmitting personal information in a subscriber-based ringback tone service will be described with reference to the accompanying drawings.

Figure 1:
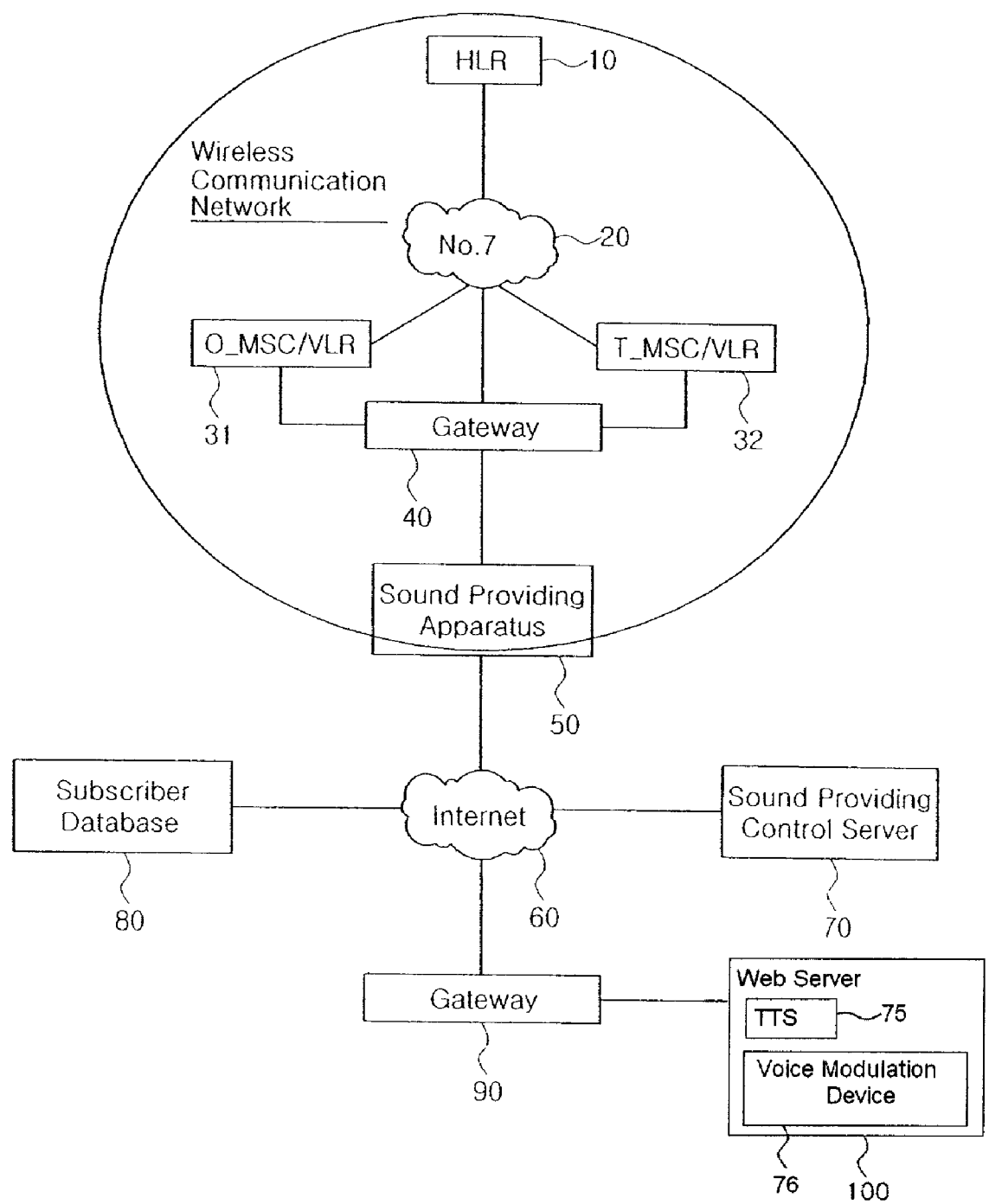
FIG. 1 is a schematic diagram showing an apparatus for transmitting personal information in a subscriber-based ringback tone service according to an exemplary embodiment of the present invention.

FIG. 1 is a schematic diagram showing an apparatus for transmitting personal information in a subscriber-based ringback tone service according to an exemplary embodiment of the present invention.

Referring to FIG. 1, the apparatus for transmitting personal information in the subscriber-based ringback tone service according to the present invention comprises a home location register 10, exchangers (O_MSC/VLR, T_MSC/VLR) 31 and 32, a sound providing apparatus (IP; Intelligent Peripheral) 50, a sound storage managing server (IP Server) 70, a subscriber database 80, and a web server 100.

The exchangers 31 and 32 communicate with the home location register 10 via No. 7 network 20 based on a signalling transfer protocol (STP). The sound providing apparatus 50 is communicatively connected to the No. 7 network 20 to communicate with the exchangers 31 and 32 via a gateway (CGS) 40. The sound storage managing server 70 communicates data with the sound providing apparatus 50 via the Internet 60. The subscriber database 80 is communicatively connected to the home location register 10 via the Internet 60. The web server 100 is communicatively connected with the sound providing apparatus 50 and with the sound providing control server 70 via the Internet 60.

The home location register 10 has all functions of an existing network element and stores the first information about whether or not each subscriber subscribes a personal ringback tone service and the second information for routing a call to the sound providing apparatus 50 in each subscriber's profile. Preferably, the first and the second information is stored in the subscriber's profile as supplementary service subscription information.

The exchangers 31 and 32 have all functions of existing network elements. When the location information of the called subscriber (or called terminal) is registered, the exchangers 31 and 32 store the first and second information provided from the home location register 10 according to the present invention. If a call connection is requested to the called terminal, the exchangers 31 and 32 communicate with the sound providing apparatus 50 based on the first and the second information to receive a specific sound from the sound providing apparatus 50 and to provide the called terminal with the received specific sound as a ringback tone replacement sound.

The specific sound may be one among a personal information sound, which corresponds to distinguishable specific information, which can identify the subscriber or can represent the subscriber's character such as the subscriber's phone number, name or nickname; a common replacement sound (hereinafter "replacement sound") such as the personal information sound, which the subscriber has chosen as a ringback tone replacement sound for a corresponding caller; and a sound which combines these replacement sounds.

In addition, the specific sound is one among: a combination of the personal information sound with the basic replacement sound which cannot be classified by the called subscriber; a combination of the personal information sound with the replacement sound which can be classified by the called subscriber; and a combination of the personal information sound with the replacement sound which is set by time zone.

Herein, the combination of sounds means that the personal information sounds are variously combined by being inserted before, after or between the replacement sounds, which are to be outputted one after another. That is, the personal information sound and the replacement sound are combined and sequentially arranged, such as:

(personal information sound)+(general ringback tone); (personal information sound)+(replacement sound)+(personal information sound); (replacement sound)+(personal information sound)+(replacement sound); (personal information sound)+(replacement sound 1)+(replacement sound 2)+(personal information sound); (personal information sound 1)+(replacement sound 1)+(personal information sound 2)+(replacement sound 2); and (replacement sound 1)+(personal information sound 1)+(replacement sound 2)+(personal information sound 2).

The sound providing apparatus 50 stores the specific sound classified by the subscriber, and communicates with the exchangers 31 and 32 via the gateway 40 to provide the exchangers 31 and 32 with the stored specific sound.

The sound storage managing server 70 communicates with the sound providing apparatus 50 via the Internet 60 to classify the kinds of the specific sound to be provided to the exchangers 31 and 32 based on identification information of the called subscriber requested for the call connection, identification information corresponding thereto and/or information of time zone when the call connection is requested, e.g., classifying the various kinds of sounds based on each condition such as who calls to, which group a caller belongs to, age, sex, occupation of a caller and/or when a subscriber is called, etc. For example, the sound storage managing server 70 assigns a code to each of various specific sounds stored in the sound providing apparatus 50. Thereafter, when a called individual subscribes to the service or changes information, the called individual chooses a specific caller, a caller group and a calling time zone, and sets a specific sound corresponding to the chosen items. Then, the sound storage managing server 70 stores information for the above items in the form of a table and so on, and controls the sound providing apparatus 50 in such a manner that the relevant sound is provided with the exchanger 32 based on the information in the table.

The web server 100, which is connected to the sound providing apparatus 50 or the means for controlling sound providing 70 via the Internet 60, adds the specific sounds to the sound providing apparatus 50 and changes information of the means for controlling sound providing 70 for setting the specific sound e.g., a specific caller, a caller's group and a calling time zone, etc. and codes corresponding thereto. A subscriber can perform the operation through a web page provided by the web server 100.

The operation of said apparatus for transmitting the specific sound in FIG. 1 is described in detail below.

If a called individual wants to subscribe to the service of transmitting a specific sound, the called individual contacts the service provider to which the called individual belongs, and the called individual is registered in the subscriber database 80 which requests registration of the sound transmitting service to the home location register 10, which is a network element. Then, the home location register 10 sets the service in its subscriber database, and transmits a routing data to the exchanger 31 or 32 which currently provides the subscriber with the service. The exchanger 32 stores the received service information and the routing data in the relevant subscriber service data.

Accordingly, if a calling subscriber requests a call setting to the relevant called subscriber, the call-terminating exchanger 32, knowing based on the registered information of the called subscriber that the specific sound transmitting service is set, call-connects to the sound providing apparatus 50 simultaneously by paging the called subscriber for the call request. At this time, the sound providing apparatus 50 cooperates with the sound storage managing server (IP Server; 70) to inquire what specific sound is set by the subscriber, and the sound storage managing server 70 provides the sound providing apparatus 50 with a code for the specific sound set by the subscriber in response to the inquiry. The sound providing apparatus 50 sends the specific sound for the relevant code instead of an existing ringback tone so that the calling subscriber can hear the sound until the called subscriber answers. If the called subscriber answers the call, the call-terminating exchanger 32 disconnects the communication between the sound providing apparatus 50 and the called subscriber and establishes the call between the called subscriber and the calling subscriber.

Figure 2:
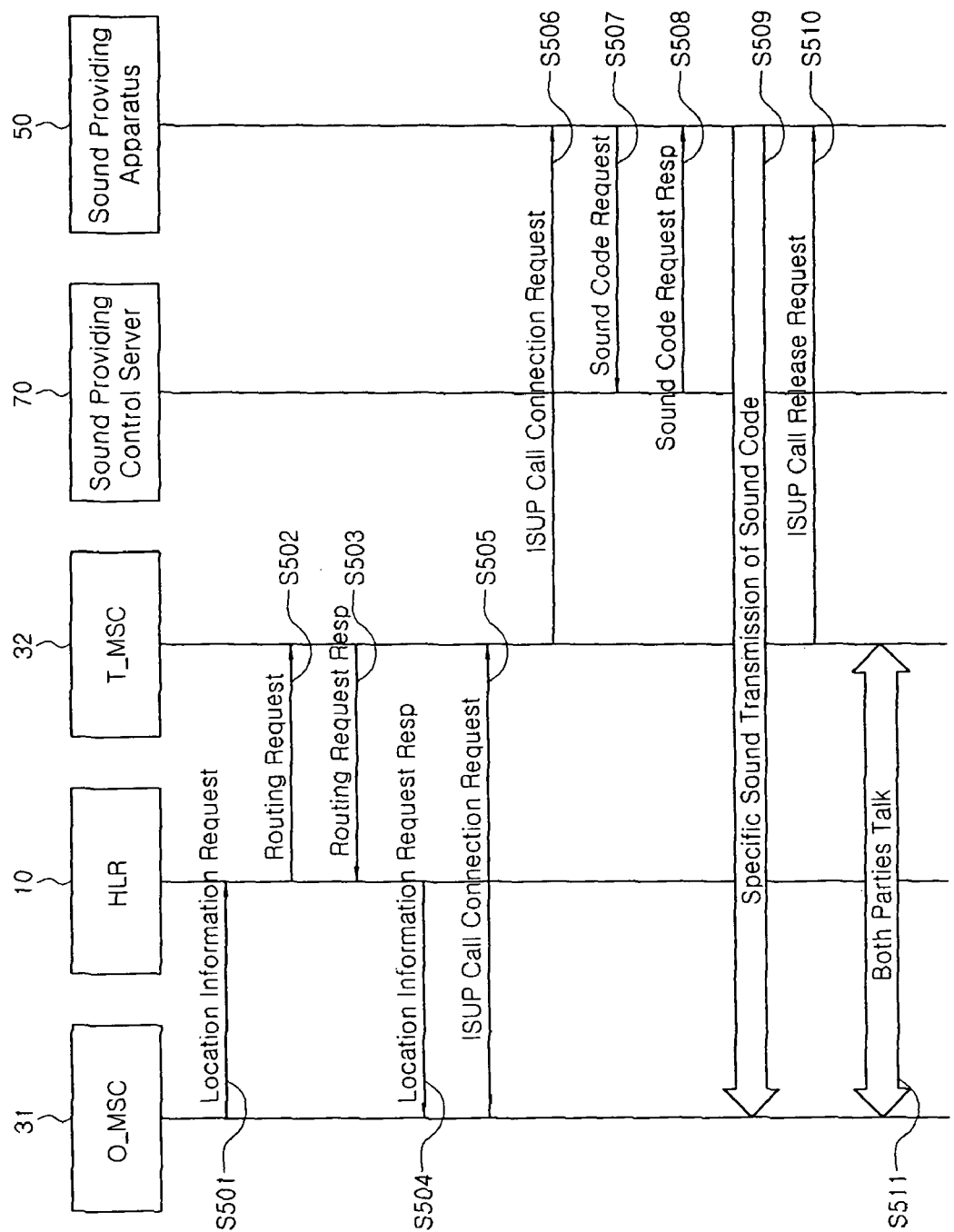
FIG. 2 is a flow chart showing an exemplary embodiment of a method for transmitting personal information according to the present invention.

FIG. 2 is a flow chart explaining an embodiment of the procedure of transmitting personal information of an apparatus as shown in FIG. 1. The call-terminating exchangers cooperate with the sound providing apparatus 50 to transmit a specific sound to a caller as a ringback tone.

Referring to FIG. 2, if a caller requests a call to a called subscriber (or a called terminal) of the present service, the relevant call-originating exchanger 31 requests location information of the called subscriber to the home location register 10 (S501).

If the request for the location information is received, the home location register 10 requests a routing to a call-terminating exchanger 32, and the call-terminating exchanger 32 provides the home location register 10 with the routing information, for example, TLDN (Temporary Local Directory Number) in response to the request (S502, S503).

The home location register 10 transmits the routing information to the call-originating exchanger 31, and the call-originating exchanger 31 requests an ISUP (ISDN User Part) call connection to the call-terminating exchanger 32 based on the routing information to establish a communication path between the exchangers (S504, S505).

Afterwards, the call-terminating exchanger 32 checks the service setting information of the called subscriber in order to confirm whether or not he subscribes to the service according to the present invention. If it is confirmed that he subscribes to the service, the call-terminating exchanger 32 requests an ISUP call connection to the sound providing means based on the routing information to establish a communication path. The originating and terminating phone numbers are provided with the ISUP call connection request. At this time, a communication path is established in the call-originating exchanger 31, the call-terminating exchanger 32 and the sound providing apparatus 50 (S506).

The sound providing apparatus 50 requests a specific sound code to the sound storage managing server 70 based on the path of the originating and terminating phone numbers received at the above step S506, and the sound storage managing server 70 searches for the designated specific sound code linked to the received originating and terminating phone numbers in response to the request to transmit the searched specific sound code to the sound providing apparatus 50. In addition, the sound providing apparatus 50 transmits a specific sound corresponding to the transmitted specific sound code as a ringback tone to the caller via the established communication path (S507, S508, S509).

As mentioned above, if the called subscriber receives a call while the specific sound is transmitted as a ringback tone, the call-terminating exchanger 32 recognizes that fact and requests an ISUP call release to the sound providing apparatus 50 so that the call can be released. At the same time, the call between the caller and the called individual is performed via the communication path interactively established with the call-originating exchanger 31 (S510, S511).

Figure 3:
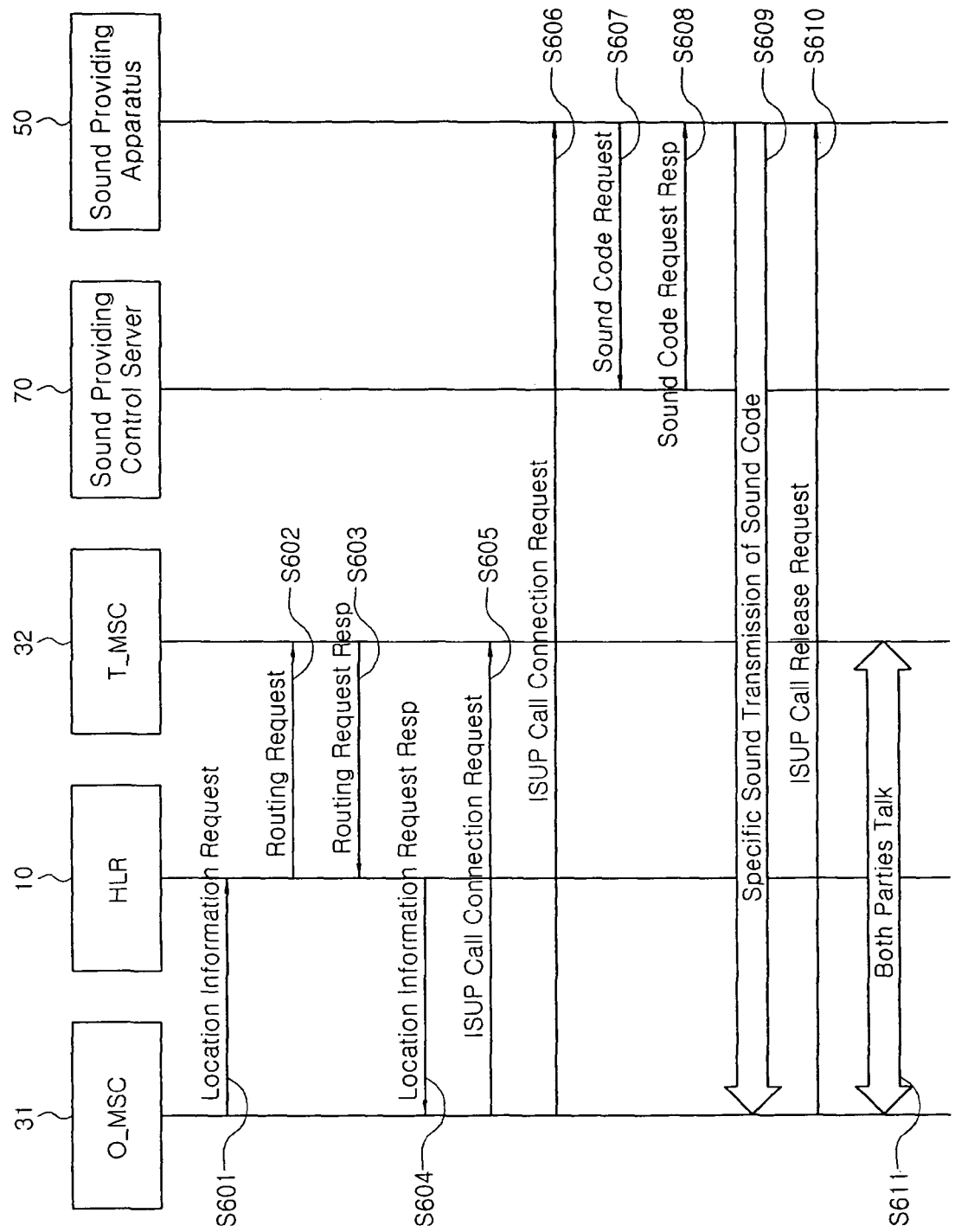
FIG. 3 is a flow chart showing another exemplary embodiment of a method for transmitting personal information according to the present invention.

FIG. 3 is a flow chart explaining another exemplary embodiment of the procedure of transmitting personal information in the apparatus as shown in FIG. 1 according to the present invention. The call-originating exchanger cooperates with the sound providing apparatus 50 to transmit a specific sound to a caller as a ringback tone.

Referring to FIG. 3, if a caller requests a call to a called subscriber (or a called terminal) of a service subscriber, a corresponding call-originating exchanger 31 requests location information of the called subscriber to the home location register 10 (S601).

If the request for the location information is received, the home location register 10 requests routing information to a call-terminating exchanger 32, and the call-terminating exchanger 32 sends the routing information, e.g., TLDN (Temporary Local Directory Number) to the home location register 10 in response to the request (S602, S603).

The home location register 10 transmits the routing information to the call-originating exchanger 31, and the call-originating exchanger 31 requests an ISUP call connection to the call-terminating exchanger 32 based on the routing information to establish a communication path between the exchangers (S604, S605).

Afterwards, the call-terminating exchanger 32 checks the service setting information of the called subscriber in order to confirm whether or not he subscribes to the service according to the present invention. If it is confirmed that he subscribes to the service of the present invention, the call-terminating exchanger 32 requests an ISUP call connection to the sound providing means based on the routing information to establish a communication path. The call terminating exchanger 32 provides the called and calling phone numbers along with the ISUP call connection request. Thus, the communication path is established between the call-originating exchanger 31, the call-terminating exchanger 32 and the sound providing apparatus 50 (S606).

The sound providing apparatus 50 requests a specific sound code to the sound storage managing server 70 based on the path of the originating and terminating phone numbers received at the above step S606, and the sound storage managing server 70 searches the designated specific sound code linked to the received originating and terminating phone numbers in response to the request to transmit the searched specific sound code to the sound providing apparatus 50. Then, the sound providing apparatus 50 transmits the specific sound corresponding to the transmitted specific sound code as a ringback tone to the caller via the established communication path (S607, S608, S609).

As mentioned above, if the called subscriber receives a call while the specific sound is transmitted as a ringback tone, the call-originating exchanger 31 recognizes the fact and requests an ISUP call release to the sound providing apparatus 50 so that the call can be released. At the same time, the call made between the caller and the called individual is performed via the communication path interactively established with the call-terminating exchanger 31 (S610, S611).

Figure 4:
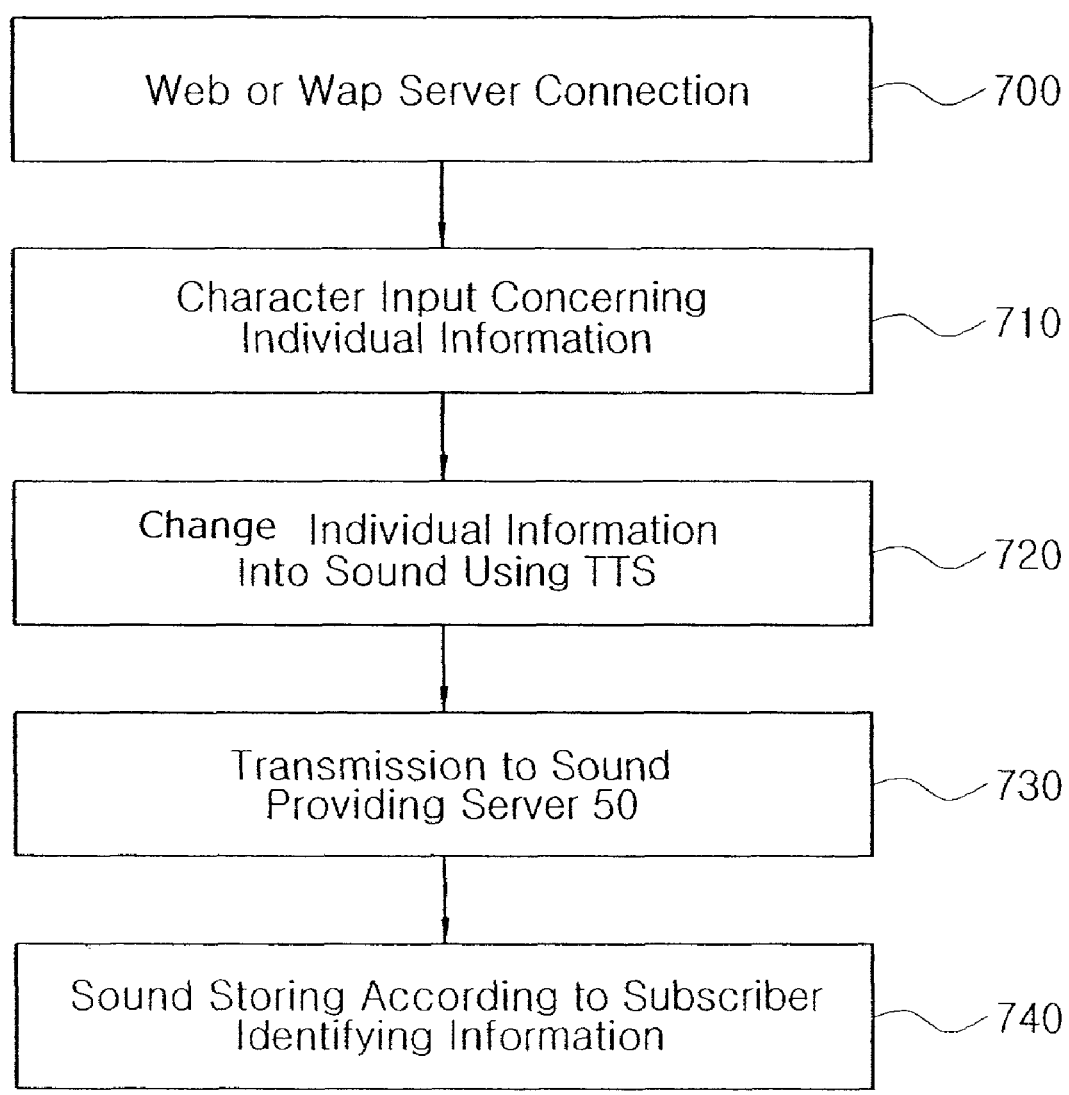
FIG. 4 is a flow chart showing an exemplary embodiment of registering a personal information sound in a method for transmitting personal information according to the present invention.

FIG. 4 is a flow chart explaining an exemplary embodiment of the procedure of registering a personal information sound according to a method for transmitting personal information of the present invention.

Referring to FIG. 4, in order to register the personal information sound according to the present invention, a called subscriber connects to a web or WAP server 100 via a wire or wireless communication network (or the Internet) by using a personal computer (web browser) or a PDA (700).

Thereafter, the called subscriber inputs information, e.g., text, to be used as a sound of the personal information in a page for inputting personal information (not shown) provided by the web or WAP server 100 (710). The personal information means the information which can identify the called subscriber or can represent the character of the called subscriber such as phone number, and/or name or nickname.

Afterwards, the web or WAP server converts the inputted text information into a voice by using a text-to-speech (TTS) engine 75 of FIG. 1 to provide the sound storage managing server 70 with the converted voice as a personal information sound (720, 730).

A person skilled in the art can easily understand that the TTS 75 engine can be placed in the web or WAP server or can be embodied as a separate server. In addition, the person skilled in the art can understand that the present invention is not limited by the TTS engine.

The sound providing apparatus 50 stores the sound while classifying subscribers into either a subscriber, who sends only a sound replacing the existing ringback tone, or a subscriber, who sends a specific sound combining the personal information sound with a replacement sound. Also, the sound providing apparatus 50 can store the specific sound while classifying it by time zone (740).

In addition, during the steps 700 to 720, a called subscriber, who wants to use the service for sending a specific sound, can provide his personal information to the sound providing apparatus 50 as a voice via the ARS operated by a service provider without using the web or WAP server 100.

Also, the personal information sound, which is changed by the TTS 75 engine from text information inputted via the web or WAP server 100, and the personal information sound, which is inputted by the ARS, can be modulated by using a voice modulation device 76 of FIG. 1. The voice modulation device 76 can modulate the personal information sound to various sounds such as children, aged men, man or women. Further, the voice modulation device 76 can modulate the personal information sound to a voice of entertainers or celebrities. The sound modulated by the TTS 75 engine can be outputted to a melody provided by the voice modulation device 76. As such, various sounds modulated by the voice modulation device 76 can be provided as personal information sounds.

Thus, various sounds can be provided to users by using the TTS engine and by modulating their own voices inputted via the ARS to various tones or other voices instead of monotonous machine sounds.

According to the present invention as described above, a ringback tone replacement sound is provided to the caller by combining or sequentially arranging distinctive specific information, which can identify the called subscriber or can represent the character of the called subscriber, with a common replacement sound (replacement sound) chosen by the called subscriber as a ringback tone replacement sound. Therefore, the called subscriber can effectively inform his identity. In addition, the subscriber provides the caller with individual promoting service, and the corporation subscriber can have a chance to publicly promote its company.

Further, since the present invention can provide more various sounds to the caller by using the voice modulation device, the service provider can satisfy the needs of the called subscribers or the callers.

According to the present invention as explained above, a user can embody a method and system for producing and transmitting multimedia contents which can be directly produced and transmitted by a user via a wire and wireless communication network.

Although the invention has been shown and described with respect to the preferred embodiments, it will be understood by those skilled in the art that various changes and modifications may be made without departing from the spirit and scope of the invention as defined in the following claims.

What is claimed is:

1. A method for sending personal information in a subscriber-based ringback tone service comprising:
   a home location register providing a call-terminating exchanger with first information about whether or not a registered ringback tone is to be replaced and second information for routing to sound providing means when a calling terminal is registered in the call-terminating exchanger;
   the call-terminating exchanger requesting a call connection to the sound providing means based on the first and the second information when the calling terminal requests a call to a called terminal;
   and the sound providing means call-connecting to the calling terminal, detecting a specific sound set corresponding to the called terminal, and providing the calling terminal with the detected specific sound when the request of the call connection is received, wherein the specific sound is generated by combining a subscriber information sound for specific information, which identifies a called subscriber or represents a character of the called subscriber, with a common ringback tone including at least one replacement sound set by the called subscriber, wherein the combination includes specific information between two of the at least one replacement sounds.

2. The method for sending personal information in a subscriber-based ringback tone service as claimed in claim 1, wherein text information of the subscriber information sound is converted into a voice by a text-to-speech engine in a web server or WAP server.

3. The method for sending personal information in a subscriber-based ringback tone service as claimed in claim 1, wherein the subscriber information sound is inputted as a voice via an ARS.

4. The method for sending personal information in a subscriber-based ringback tone service as claimed in claim 3, wherein the subscriber information sound is modulated by a voice modulation device.

5. The method for sending personal information in a subscriber-based ringback tone service as claimed in claim 1, wherein the specific information includes at least one of a phone number, a name, a nick name and the character of the called subscriber.

6. The method for sending personal information in a subscriber-based ringback tone service as claimed in claim 1, wherein the combination includes one or more among:
   (a subscriber information sound)+(a general ringback tone);
   (the subscriber information sound)+(the replacement sound)+(the subscriber information sound);
   (the replacement sound)+(the subscriber information sound)+(the replacement sound);
   (the subscriber information sound)+(a replacement sound 1)+(a replacement sound 2)+(the subscriber information sound);
   (a subscriber information sound 1)+(the replacement sound 1)+(a subscriber information sound 2)+(the replacement sound 2); and
   (the replacement sound 1)+(the subscriber information sound 1)+(a replacement sound 2)+(the subscriber information sound 2).

7. The method for sending personal information in a subscriber-based ringback tone service as claimed in claim 1, wherein the subscriber information sound is different by time zone.

8. The method for sending personal information in a subscriber-based ringback tone service as claimed in claim 1, wherein the replacement sound is different by time zone.

9. The method for sending personal information in a subscriber-based ringback tone service as claimed in claim 1, wherein the replacement sound is at least one among a basic replacement sound which is not classified by caller; a replacement sound which is classified by caller; and a replacement sound which is set by time zone.

10. A method for transmitting personal information in a subscriber-based ringback tone service comprising:
    a call-originating exchanger requesting location information to a home register when a calling terminal requests a call to a called terminal;
    a home location register requesting routing information of the called terminal to a call-terminating exchanger and providing the call-terminating exchanger with the routing information, first information and second information from the call-terminating exchanger if the request for the location information of the called terminal is received, wherein the first information concerns about whether a ringback tone correspondingly set in the called terminal is to be replaced and the second information is for routing to a sound providing means;
    the call-originating exchanger requesting a call connection to the sound providing means based on the first and the second information; and
    the sound providing means call-connecting to the calling terminal, detecting a specific sound which is correspondingly set to the called terminal to provide the calling terminal with the detected specific sound if the request for the call connection is received,
    wherein the specific sound is generated by combining a personal information sound for specific information, which identifies a called subscriber or represents a character of the called subscriber, with the ringback tone including at least one replacement sound which is set by the called subscriber, wherein the combination includes specific information between two of the at least one replacement sounds.

11. The method for sending personal information in a subscriber-based ringback tone service as claimed in claim 10, wherein text information of the personal information sound is converted into a sound by a text-to-speech engine.

12. The method for sending personal information in a subscriber-based ringback tone service as claimed in claim 11, wherein the personal information sound is inputted via an ARS.

13. The method for sending personal information in a subscriber-based ringback tone service as claimed in claim 12, wherein the personal information sound is modulated by a voice modulation device.

14. The method for sending personal information in a subscriber-based ringback tone service as claimed in claim 10, wherein the specific information includes at least one of a phone number, a name, a nick name and the character of the called subscriber.

15. The method for sending personal information in a subscriber-based ringback tone service as claimed in claim 10, wherein the combination includes at least one of:
  (a subscriber information sound)+(a general ringback tone);
  (personal information sound)+(the replacement sound)+(the personal information sound);
  (the replacement sound)+(the personal information sound)+(the replacement sound);
  (the personal information sound)+(a replacement sound 1)+(a replacement sound 2)+(the personal information sound);
  (a personal information sound 1)+(the replacement sound 1)+(a personal information sound 2)+(the replacement sound 2); and
  (the replacement sound 1)+(the personal information sound 1)+(the replacement sound 2)+(the personal information sound 2).

16. The method for sending personal information in a subscriber-based ringback tone service as claimed in claim 10, wherein the personal information sound is different by time zone.

17. The method for sending personal information in a subscriber-based ringback tone service as claimed in claim 10, wherein the replacement sound is different by time zone.

18. The method for sending personal information in a subscriber-based ringback tone service as claimed in claim 10, wherein the replacement sound is at least one of a basic replacement sound which is not classified by callers; a replacement sound which is classified by callers; and a replacement sound which is set by time zone.

19. An apparatus for transmitting personal information in a subscriber-based ringback tone service comprising:
  a home location register for providing first information about whether or not a ringback tone set in a profile of a called terminal of a call-terminating exchanger is replaced and second information for routing to sound providing means when the called terminal is registered in the call-terminating exchanger;
  the call-terminating exchanger for requesting a call connection to the sound providing means based on the first and the second information if a request for a call to the called terminal is received; and
  the sound providing means for call connecting with a calling terminal, detecting a specific sound which is correspondingly set to the calling terminal to provide the calling terminal with the detected specific sound if the request for the call connection is received from the call-terminating exchanger, wherein the specific sound is generated by combining a personal information sound for specific information with a common ringback tone including at least one replacement sound which is set by a called, subscriber wherein the combination includes specific information between two of the at least one replacement sounds.

20. The apparatus for transmitting personal information in a subscriber-based ringback tone service as claimed in claim 19, further comprising:
  a web server connected to the Internet and communicating with the sound providing means via a gateway,
  wherein the web server comprises a TTS engine for changing text of specific information which is inputted by the called subscriber and which can identify the called subscriber or can represent a character of the called subscriber, and the sound providing means generates a specific sound by combining the personal information sound transmitted from the web server with the ringback tone replacement sound set by the called subscriber to provide the calling terminal with the specific sound as the replacement sound through the call-terminating exchanger.

21. The apparatus for transmitting personal information in a subscriber-based ringback tone service as claimed in claim 19, further comprising an ARS for the called subscriber to input the specific information as a voice.

22. The apparatus for transmitting personal information in a subscriber-based ringback tone service as claimed in claim 19, wherein the specific information includes at least one of a phone number, a name, a nick name and a character of the called subscriber.

23. The apparatus for transmitting personal information in a subscriber-based ringback tone service as claimed in claim 20, wherein the web server further comprises a voice modulation device for modulating the personal information sound to various voices.

24. The apparatus for transmitting personal information in a subscriber-based ringback tone service as claimed in claim 23, wherein the personal information sound is outputted as a voice or a melody.

* * * * *